United States Patent
Fukuchi (10) Patent No.: US 8,085,634 B2
(45) Date of Patent: Dec. 27, 2011

(54) OPTICAL DISK DRIVE, AND METHOD FOR DETERMINING RECORDING STRATEGY

(75) Inventor: Kiyoshi Fukuchi, Nerima-ku (JP)

(73) Assignee: TEAC Corporation, Tama-shi, Tokyo (JP)

( * ) Notice: Subject to any disclaimer, the term of this patent is extended or adjusted under 35 U.S.C. 154(b) by 649 days.

(21) Appl. No.: 11/775,171

(22) Filed: Jul. 9, 2007

(65) Prior Publication Data
US 2008/0008074 A1  Jan. 10, 2008

(30) Foreign Application Priority Data
Jul. 10, 2006  (JP) .................................. 2006-189039

(51) Int. Cl.
*G11B 7/00* (2006.01)
(52) U.S. Cl. .................................. 369/47.53; 369/59.11
(58) Field of Classification Search .................. None
See application file for complete search history.

(56) References Cited

U.S. PATENT DOCUMENTS

| | | | |
|---|---|---|---|
| 6,912,188 B2 | 6/2005 | Morishima | |
| 7,068,579 B2 * | 6/2006 | Tasaka et al. | 369/59.24 |
| 2004/0213106 A1 * | 10/2004 | Pereira | 369/47.51 |
| 2005/0063268 A1 * | 3/2005 | Ninomiya | 369/47.53 |
| 2005/0117481 A1 * | 6/2005 | Akiyama et al. | 369/47.53 |
| 2006/0109767 A1 * | 5/2006 | Nakajo | 369/59.12 |
| 2006/0133237 A1 | 6/2006 | Kishigami | |
| 2006/0239166 A1 * | 10/2006 | Yu | 369/59.11 |

FOREIGN PATENT DOCUMENTS

| | | |
|---|---|---|
| JP | 2002-269744 A | 9/2002 |
| JP | 2003-59047 A | 2/2003 |
| JP | 2005-251258 A | 9/2005 |
| JP | 2005-322312 A | 11/2005 |
| WO | WO 2005/109408 A1 | 11/2005 |

OTHER PUBLICATIONS

Notice of Grounds for Rejection (JP) mailed Aug. 18, 2009, issued in corresponding Japanese Application No. 2006-189039.
Decision of Rejection (JP), mailed Dec. 15, 2009, issued in corresponding Japanese Application No. 2006-189039, filed Jul. 10, 2006.

* cited by examiner

*Primary Examiner* — Peter Vincent Agustin
*Assistant Examiner* — Emily Frank
(74) *Attorney, Agent, or Firm* — Seed IP Law Group PLLC (57) ABSTRACT

An optical disk drive for recording data in accordance with a recording strategy determines a recording strategy of an unknown optical disk through comparatively-simple processing. When a loaded optical disk is an unknown disk, a control section reads a recommended recording strategy from a predetermined area on the loaded optical disk and reads correction parameters corresponding to the loaded optical disk from memory. The control section makes a correction to the read, recommended recording strategy in accordance with the correction parameters, and converts a recording pattern into a recording pulse in accordance with the corrected, recommended recording strategy. After conversion of the recording pattern into the recording pulse, the control section performs OPC and subsequently commences recording of actual data.

8 Claims, 7 Drawing Sheets

Fig. 1

|  | RECORDING STRATEGY |
|---|---:|
| Tsfp | 4 [ns.] |
| Tefp | 26 [ns.] |
| Tmp | 0 [ns.] |
| Tslp | 0 [ns.] |
| Telp | 9 [ns.] |
| Tlc | 34 [ns.] |

|      | CORRECTION PARAMETER |
|------|---------------------:|
| Tsfp | 1 |
| Tefp | -1 |
| Tmp  | 0 |
| Tslp | 0 |
| Telp | -1 |
| Tlc  | 0 |

Fig. 6A

|      | CORRECTION PARAMETER |
|------|---------------------:|
| Tsfp | 1.25 |
| Tefp | 0.95 |
| Tmp  | 1 |
| Tslp | 1 |
| Telp | 0.89 |
| Tlc  | 1 |

|      | RECOMMENDED RECORDING STRATEGY | CORRECTION PARAMETER | CORRECTED RECORDING STRATEGY |
|------|---:|---:|---:|
| Tsfp | 4[ns.] | 1 | 5[ns.] |
| Tefp | 26[ns.] | −1 | 25[ns.] |
| Tmp | 0[ns.] | 0 | 0[ns.] |
| Tslp | 0[ns.] | 0 | 0[ns.] |
| Telp | 9[ns.] | −1 | 8[ns.] |
| Tlc | 34[ns.] | 0 | 34[ns.] |

Fig. 8A

|      | RECOMMENDED RECORDING STRATEGY | CORRECTION PARAMETER | CORRECTED RECORDING STRATEGY |
|------|---:|---:|---:|
| Tsfp | 4[ns.] | 1.25 | 5[ns.] |
| Tefp | 26[ns.] | 0.95 | 25[ns.] |
| Tmp | 0[ns.] | 1 | 0[ns.] |
| Tslp | 0[ns.] | 1 | 0[ns.] |
| Telp | 9[ns.] | 0.89 | 8[ns.] |
| Tlc | 34[ns.] | 1 | 34[ns.] |

Fig. 8B

OPTICAL DISK DRIVE, AND METHOD FOR DETERMINING RECORDING STRATEGY

PRIORITY INFORMATION

This application claims priority to Japanese Patent Application No. 2006-189039 filed on Jul. 10, 2006, which is incorporated herein by reference in its entirety.

BACKGROUND

1. Technical Field

The present invention relates to an optical disk drive which records information on an optical disk and, more particularly, to a technique for determining a recording strategy used at the time of recording operation.

2. Related Art

A hitherto-available method—by means of which an optical disk drive capable of recording data on a DVD-RW, or the like, stores data in an optical disk—is one for controlling a pulse width or a pulse interval of a recording pulse in accordance with conditions for a recording pulse which are called a "recording strategy." Recording quality is enhanced by use of this method.

In relation to the recording strategy, recommended values are usually determined by a disk manufacturer, or the like. Moreover, the recording strategy is previously recorded as a recommended recording strategy in a predetermined area on the optical disk. However, characteristics of an optical pickup vary from one optical disk drive to another. For this reason, it may be the case where some of the optical disk drives fail to acquire sufficient recording quality when recording is performed by use of a previously-determined recording strategy.

Accordingly, in connection with known optical disks previously expected to be used, there is a case where unique optimum recording strategies of respective optical disk drives have been determined previously and where the thus-determined optimum recording strategies are stored in nonvolatile memory, such as flash ROM provided in an optical disk drive. Use of such an individual recording strategy enables greater enhancement of recording quality when compared with a case where recording is performed by use of the recommended recording strategy. However, because of alterations in specifications of a known disk or variations in manufacture, it may be the case where sufficient recording quality is not acquired even when data are recorded by use of the optimum recording strategy previously held in the optical disk drive.

Meanwhile, in the case of an unknown optical disk whose optimum recording strategy has not been in advance, there may be the case where an intermediate recording strategy for use with an unknown optical disk is stored in nonvolatile memory or where a recommended recording strategy recorded in a predetermined area on the optical disk and determined by a disk manufacturer, or the like, is used in unmodified form. However, an individual difference exists in each of disk drives with regard to the wavelength of a laser diode of an optical pickup (OPU) and an angle of inclination of an optical axis with respect to a disk plane. Therefore, there may arise a case where use of such a recording strategy results in a failure to acquire sufficient recording quality.

Accordingly, methods described in JP 2003-59047 A and JP 2005-322312 A have been proposed as a method for determining a recording strategy for an unknown optical disk.

Under an optical disk recording method described in JP 2003-59047 A, an unknown optical disk whose recording strategy is not stored in memory or an optical disk whose recording strategy stored in memory fails to allow acquisition of superior recording quality is subjected to test recording, while recording power is being changed, by use of all of recording strategies stored in memory or a plurality of appropriately-adopted recording strategies. Thus, a recording strategy which allows acquisition of relatively-high signal quality is selected and used for actual recording.

Under an optical disk recording method described in JP 2005-322312 A, when an optical disk whose optimum recording strategy is not identified is subjected to recording, a recording strategy used at the time of recording is determined from a recommended recording strategy recorded in a predetermined are of an optical disk and a characteristic of the optical pickup of the optical disk drive, and the optical disk is subjected to recording in accordance with the thus-determined recording strategy.

Specifically, JP 2003-59047 A describes processing for determining a recording strategy used at the time of recording by means of subjecting an unknown optical disk to a plurality of test recording operations by use of a plurality of recording strategies. JP 2005-322312 A describes processing for determining a recording strategy from a recommended recording strategy and a characteristic of the optical pickup of the optical disk drive. However, these processing operations are more complicated than processing for determining a recording strategy of a known optical disk, and there is a risk of consumption of a long period of time before performance of actual recording.

SUMMARY

The present invention is directed toward an optical disk drive for recording data in accordance with a recording strategy, wherein, even when an optimum strategy previously set for a loaded optical disk is inappropriate or when an optimum recording strategy is not prepared previously, a recording strategy is determined through comparatively-simple processing.

The present invention provides an optical disk drive for recording data on a loaded optical disk in accordance with a recording strategy corresponding to the loaded optical disk, the drive comprising:

a recording strategy determination section for determining a recording strategy of the loaded optical disk from an optimum recording strategy of a specific optical disk previously set for the optical disk drive, a recommended recording strategy previously recorded in a predetermined area on the specific optical disk, and a recommended recording strategy previously recorded in the predetermined area on the loaded optical disk; and a recording section for recording data on the loaded optical disk in accordance with the determined recording strategy.

In one mode of the optical disk drive of the present invention, the optical disk drive further comprises a recording strategy storage section for storing recording strategies previously determined in accordance with attributes of optical disks. The recording strategy determination section, when a recording strategy corresponding to the loaded optical disk is not stored in the recoding strategy storage section, determines the recording strategy of the loaded optical disk from the optimum recording strategy of the specific optical disk, the recommended recording strategy of the specific optical disk, and the recommended recording strategy of the loaded optical disk.

In one mode of the optical disk drive of the present invention, the recording strategy determination section makes a correction to the recommended recording strategy of the loaded optical disk in accordance with correction parameters determined from a relationship between the optimum recording strategy of the specific optical disk and the recommended recording strategy of the specific optical disk, thereby determining the corrected, recommended recording strategy of the loaded optical disk as a recording strategy of the loaded optical disk.

In one mode of the optical disk drive of the present invention, the optical disk drive further comprises a correction parameter storage section for recording the correction parameters.

In one mode of the optical disk drive of the present invention, the correction parameter storage section stores respective correction parameters previously determined in correspondence to respective recording speeds; and the recording strategy determination section determines correction parameters corresponding to a recording speed employed at the time of recording of data in accordance with correction parameters stored in the correction parameter storage section and makes a correction to the recommended recording strategy of the loaded optical disk in accordance with the determined correction parameters.

In one mode of the optical disk drive of the present invention, the optical disk drive further comprises a recording strategy optimization section for causing the recording section to perform test recording while changing a recording strategy with reference to the recording strategy determined before recording actual data on the loaded optical disk and making a correction to the determined recording strategy in accordance with a result of test recording. The recording strategy determination section records data on the loaded optical disk in accordance with the corrected recording strategy.

According to the present invention, an optical disk drive for recording data in accordance with a recording strategy can determine a recording strategy for an unknown optical disk through comparatively-simple processing.

The invention will be more clearly comprehended by reference to the embodiment provided below. However, the scope of the invention is not limited to the embodiment.

BRIEF DESCRIPTION OF THE DRAWINGS

A preferred embodiment of the present invention will be described in detail by reference to the following drawings, wherein.

DETAILED DESCRIPTION

The best mode for implementing the present invention (hereinafter called an "embodiment") will be described hereunder by reference to the drawings.

Figure 1:
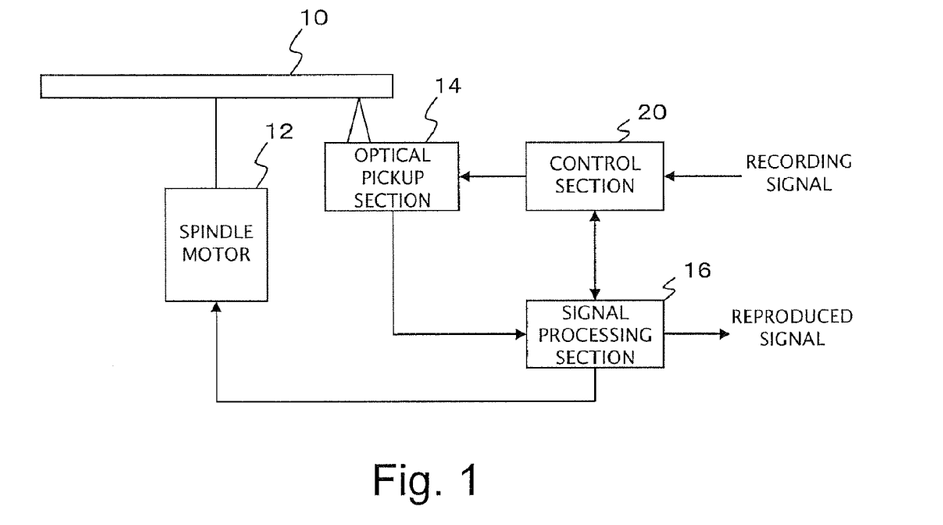
FIG. 1 is a view showing the principal configuration of an optical disk drive of an embodiment of the present invention.

FIG. 1 is a view showing the principal configuration of an optical disk drive of an embodiment of the present invention. The optical disk drive comprises a spindle motor 12; an optical pickup section 14; a signal processing section 16; and a control section 20.

The optical pickup section 14 exposes an optical disk 10 rotationally driven by the spindle motor 12 to a laser beam, to thus perform recording or reproducing operation. A drive signal for recording purpose is supplied from the control section 20. When the optical disk 10 is; for example, a DVD-RW disk, pits having lengths from 3 T to 11 T and 14 T are formed in the optical disk 10. When the optical disk 10 is a CD-R disk, pits having lengths from 3 T to 11 T are formed, thereby recording data. Moreover, the optical pickup section 14 emits a beam of reproducing power and outputs to the signal processing section 16 a reproduction RF signal acquired from reflected light of the beam.

The signal processing section 16 demodulates an input RF signal and outputs the thus-demodulated signal as reproduction data. After noise has been eliminated from the reproduction data by means of a filter, a clock signal is generated by means of an equalizer and a PLL circuit, whereby demodulation is performed. Moreover, the signal processing section 16 extracts a tracking error signal and a focus error signal from the reflected light and outputs a servo signal to the optical pickup section 14.

The control section 20 generates a drive signal for use in driving an LD (laser diode) provided in the optical pickup section 14 in accordance with a recording signal.

Figure 2:
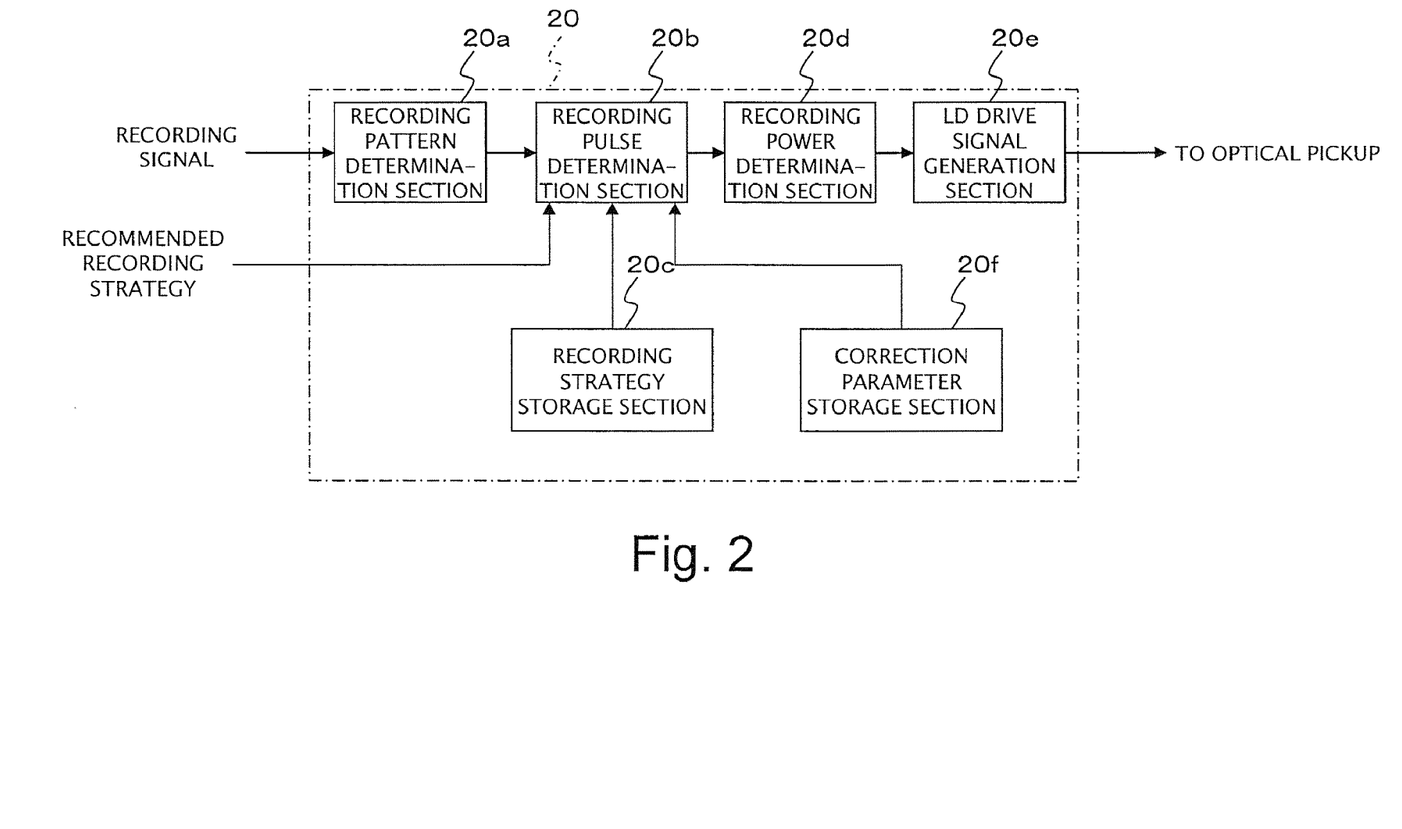
FIG. 2 is a view showing a configuration block of a control section.

FIG. 2 is a view showing a configuration block of the control section 20. The control section 20 is formed from a DSP (Digital Signal Processor), or the like; and includes as functional blocks a recording pattern determination section 20a, a recording pulse determination section 20b, a recording strategy storage section 20c, a recording power determination section 20d, an LD drive signal generation section 20e, and a correction parameter storage section 20f.

The recording pattern determination section 20a subjects data to be recorded to EFM modulation and determines a recording pattern corresponding to the data to be recorded. The recording pattern is a rectangular pulse sequence showing a sequence of recording marks (amorphous), which are formed in the optical disk 10 in response to the data to be recorded, and recording spaces.

The recording pulse determination section 20b converts the recording pattern determined by the recording pattern determination section 20a into a recording pulse in accordance with the recording strategy corresponding to the optical disk loaded in the optical disk drive.

The recording strategy varies according to the optical pickup section 14 and an optical disk used for recording (a difference among materials of optical disks produced by manufacturers and variations in a characteristic of an optical disk). For these reasons, in connection with each of optical disks manufactured by principal manufacturers, recording and measurement are repeated, to thus empirically determine a recording strategy unique to an individual optical disk drive.

The thus-determined recording strategies are previously recorded in the recorded strategy storage section 20*c* in correspondence to disk attributes, such as the type of a disk, information about a manufacturer, and the like.

Therefore, in accordance with disk identification information previously recorded in the optical disk, the recording pulse determination section 20*b* selects a recording strategy corresponding to an optical disk loaded in the optical disk drive from a group of recording strategies recorded in the recording strategy storage section 20*c*; and converts the recording pattern into a recording pulse in accordance with the selected recording strategy. Meanwhile, in the case of an unknown optical disk whose recording strategy is not stored in the recording strategy storage section 20*c*, the recording pulse determination section 20*b* makes a correction to the recommended recording strategy by use of a correction parameter which is determined through the following procedures and stored in the correction parameter storage section 20*f*. Subsequently, the recording pulse determination section 20*b* converts the recording pattern into a recording pulse by use of the corrected, recommended recording strategy.

The present embodiment is characterized in that, in the case of an unknown optical disk, the recording pulse determination section 20*b* converts a recording pattern into a recording pulse by use of the recommended recording strategy corrected in accordance with the correction parameters rather than using, in unmodified form, the recommended recording strategy previously recorded in the loaded optical disk. According to the present embodiment, in the case of an unknown optical disk, a recommended recording strategy previously recorded in the unknown optical disk is not used in unmodified form, and the recommended recording strategy corrected by use of correction parameters determined for each optical disk drive are used. Therefore, when compared with the case where the recommended recording strategy is used in unmodified form, a decrease in recording quality can be reduced. The way to determine the correction parameters will be described later.

Before actual recording of data, the recording power determination section 20*d* performs optimization of the height of a recording pulse; namely, optimization of recording power (Optimum Power Control: OPC). Specifically, the recording power determination section 20*d* records test data in a test area provided at a predetermined position on an optical disk while changing recording power in a plurality of steps in a plurality of sectors; for example, in 16 steps in 16 sectors on a per-sector basis; reproduces the test data in the respective sectors; and evaluates signal quality of the thus-reproduced test data. The degree of modulation is usually used as the quality of a reproduced signal. Provided that the degree of modulation is taken as "m," the degree of modulation "m" is a parameter computed from a peak voltage (A) and a bottom voltage (B) of an envelope of a reproduced RF signal including DC components, according to an equation of $m=(A-B)/A$. When falling within a predetermined range (e.g., 0.6 to 0.7), the value of the degree of modulation is deemed to be optimum. Recording power at which a desired degree of modulation "m" (a reference degree of modulation) is determined as optimum recording power.

The LD drive signal generation section 20*e* generates a drive signal used for driving the LD (laser diode) in the optical pickup section 14 in such a way that the determined recording pulse and the determined recording power are acquired; and outputs the thus-generated drive signal to the optical pickup section 14.

Figure 3:
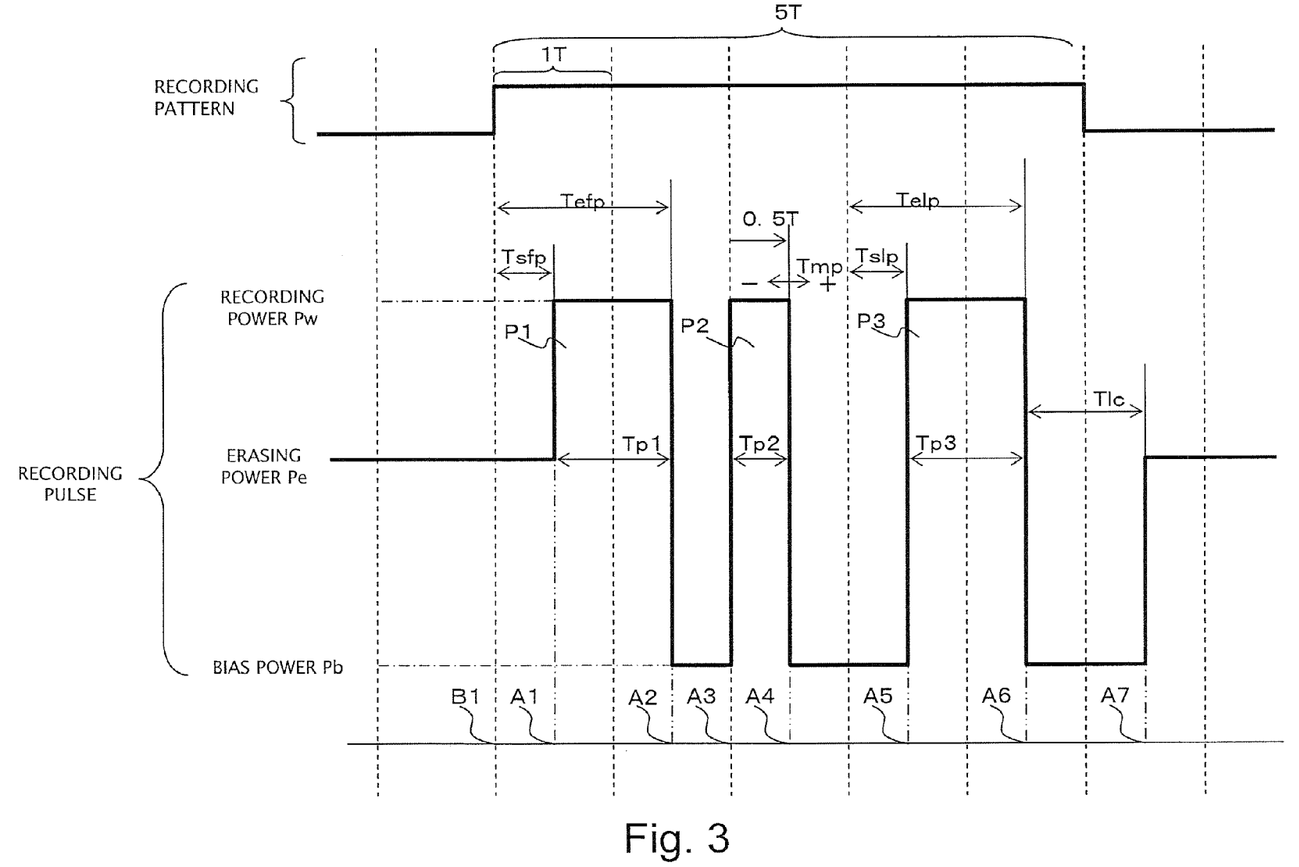
FIG. 3 is a view showing an example recording pattern having a pulse width 5 T and example recording pulses corresponding to the recording pattern.

FIG. 3 is a view showing an example recording pattern having a pulse width 5 T and example recording pulses corresponding to the recording pattern. In FIG. 3, reference symbol T designates the unit of a pulse width; and 1 T designates a clock period.

In FIG. 3, the recording pulse comprises a first pulse P1, a second pulse P2, and a third pulse P3. Laser power of the recording pulse is controlled in three steps; namely, recording power Pw, bias power Pb, and erasing power Pe. A recording film on the optical disk 10 is fused at the recording power Pw; the thus-fused film is quenched at the bias power Pb, to thus create a recording mark; and the recording film is crystallized at the erasing power Pe, thereby generating an area of high reflectivity. In FIG. 3, Tsfp, Tefp, Tmp, Tslp, Telp, and Tlc are parameters which respective define the width and interval of a recording pulse. These parameters are provided in the recording strategy. A point in time A1 showing the front end of a first pulse P1 is set, after a lag of Tsfp, subsequently to a point in time B1 showing the front end of a pulse of the recording pattern. A point in time A2 showing the rear end of the first pulse P1 is set, after a lag of Tefp, subsequently to the point in time B1. A point in time A3 showing the front end of a second pulse P2 is set, after a lag of 2 T, subsequently to the point in time B1. Moreover, a point in time A4 showing the rear end of the second pulse P2 is set at a point defined as Tmp with reference to a point in time which lags 0.5 T behind the point in time A3 and which is taken as a reference point in time. A point in time A5 showing the front end of a third pulse P3 is set at a point which lags Tslp behind the point in time that lags 3 T behind the point in time B1. A point in time A6 showing the rear end of the third pulse P3 is set at a point which lags Telp behind the point in time that lags 3 T behind the point in time B1. Tlc designates a quenching period which is subsequent to the end of the third pulse P3 and in which quenching is performed at bias power Pb. Thus, the pulse width and pulse interval of the recording pulse can be determined by means of setting values of the respective parameters.

Figure 4:
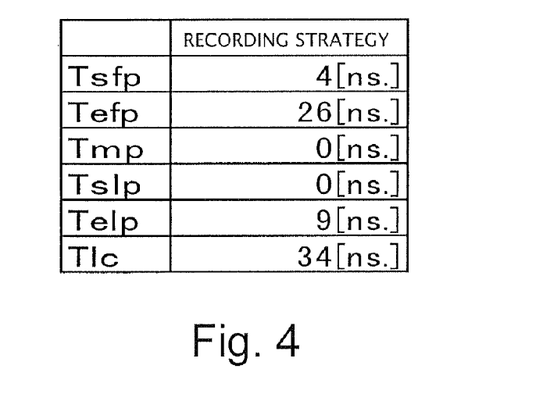
FIG. 4 is a view showing values of example parameters indicated by a recording strategy.

FIG. 4 shows example values of the respective parameters Tsfp, Tefp, Tmp, Tslp, Telp, and Tlc shown in FIG. 3. The respective parameters shown in FIGS. 3 and 4 are examples of recording patterns, each of which has a pulse width 5 T. Different parameters are determined with respect to recording patterns having pulse widths other than 5 T, and the parameters are provided in a recording strategy. The parameters shown in FIG. 3 are mere examples of parameters which are provided in a recording strategy and which can define the width and interval of a recording pulse. Other parameters may also be provided in a recording strategy, to thus determine the width and interval of the recording pulse.

In the present embodiment, the parameters provided in a recommended recording strategy previously recorded in the unknown optical disk are corrected by use of correction parameters having unique values according to an optical disk drive, whereby a decrease in recording quality, which would otherwise be caused by a characteristic of an optical pickup, can be prevented.

A way to determine the correction parameters will be described by use of a flowchart shown in FIG. 5.

Figure 5:
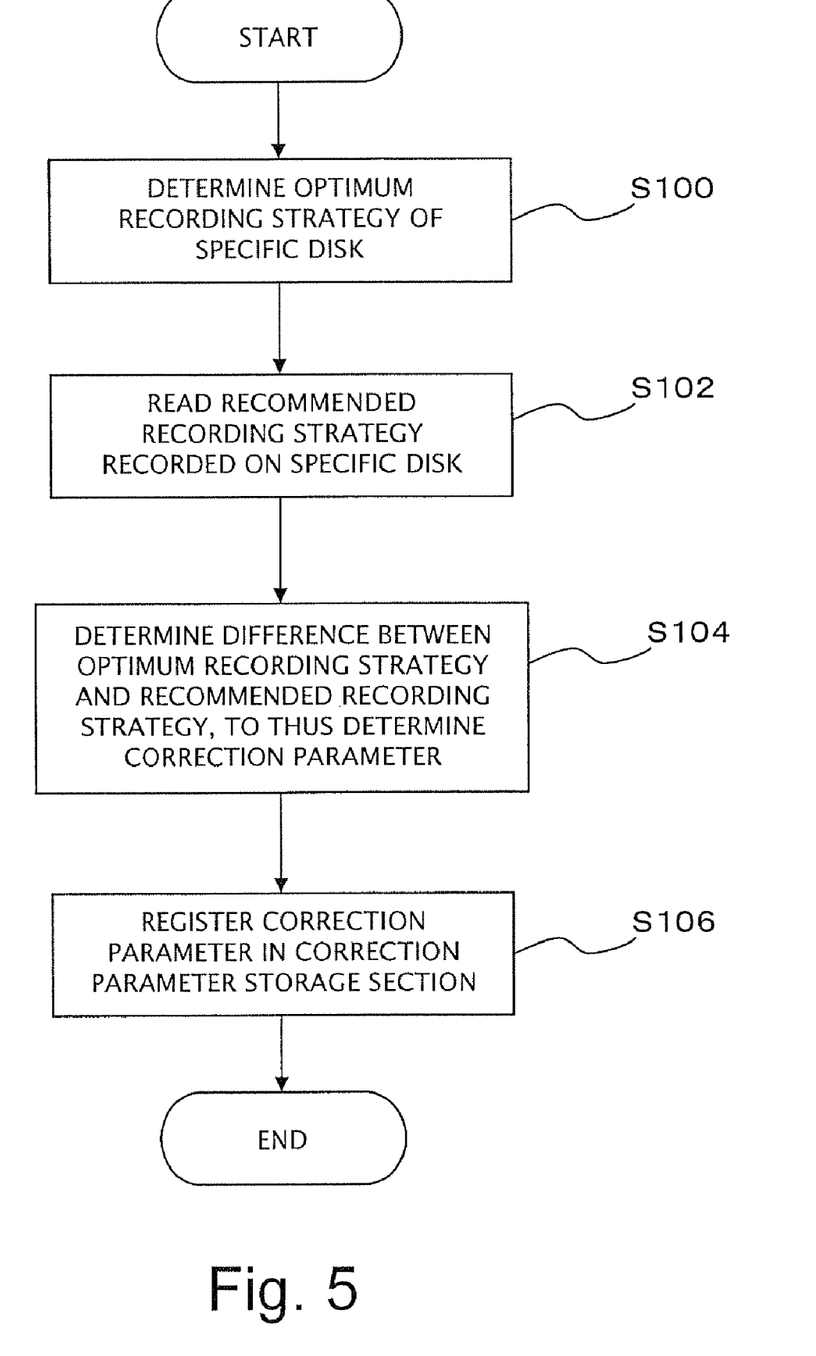
FIG. 5 is a flowchart showing procedures for determining correction parameters.

In FIG. 5, the control section 20 first empirically determines an optimum recording strategy for a specific optical disk of an optical disk drive of interest by means of repeatedly subjecting the specific optical disk to recording and measurement (S100). For instance, test data are recorded (on a trial basis) in a predetermined area (a PCA area) of an optical disk while recording power is taken as a fixed value and a recording strategy is variously changed. The test data are reproduced, and a recording strategy—at which the quality of a reproduced signal; for example, the degree of modulation, a β value, a jitter, an error rate, or the like, becomes best—is selected as an optimum recording strategy. Now, the specific optical disk is one whose stable recording quality has been previously guaranteed in connection with a plurality of models of optical disk drives manufactured by a plurality of manufactures. For instance, the specific optical disk is; for example, a so-called standard disk which serves as an industrial standard employed when the performance of an optical disk drive is inspected, or the like.

Further, the control section 20 reads a recommended recording strategy previously recorded in a predetermined area on the specific optical disk (S102). Next, differences between the optimum recording strategy and the recommended recording strategy are acquired, to thus determine correction parameters (S104). Specifically, differences between respective parameters provided in the optimum recording strategy and corresponding parameters provided in the recommended recording strategy are determined. The thus-determined differences among the parameters are registered as correction parameters in the correction parameter storage section 20f (S106).

Through the above processing operations, correction parameters are determined for each type of an optical disk, such as a DVD-RW disk, a DVD-R disk, a CD-R disk, a CD-RW disk, and the like, and for each recording speed. The correction parameters are previously registered in the correction parameter storage section 20f while being associated with identification information, such as the type of an optical disk, a recording speed, and the like. The correction parameters are determined at; e.g., an adjustment stage before shipment of an optical disk drive, and the thus-determined parameters are stored in the correction parameter storage section 20f. Thus, determination of differences between the recommended recording strategy previously recorded in a specific optical disk and an optimum recording strategy acquired directly from the optical disk drive enables determination of errors in the recommended recording strategy for each optical disk drive. Errors among the parameters represented by the correction parameters are greatly affected by an individual difference of each disk drive, such as the wavelength of the laser diode of the optical pickup section 14, an angle of inclination of the optical axis with respect to a disk plane, and the like. Specifically, a correction is made to the recommended recording strategy previously stored in the optical disk according to correction parameters, thereby correcting the individual difference of each disk drive.

Figure 6A:
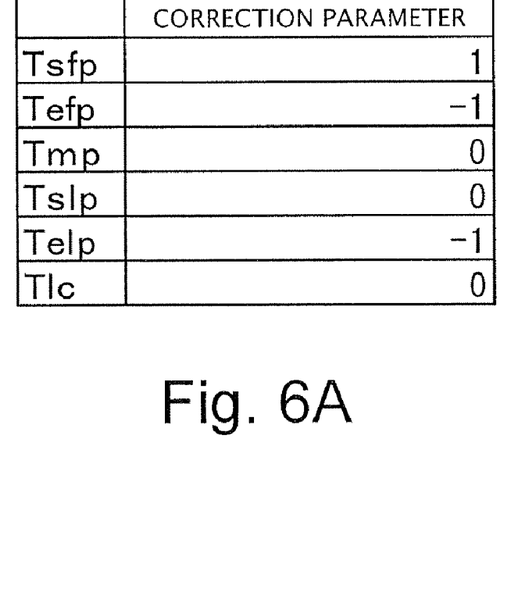
FIG. 6A is a view showing values of example correction parameters.

FIG. 6A is a view showing values of example correction parameters acquired when differences between an optimum recording strategy and a recommended recording strategy are determined by means of subtracting values of parameters provided in the recommended recording strategy from respective parameters provided in the optimum recording strategy.

Figure 6B:
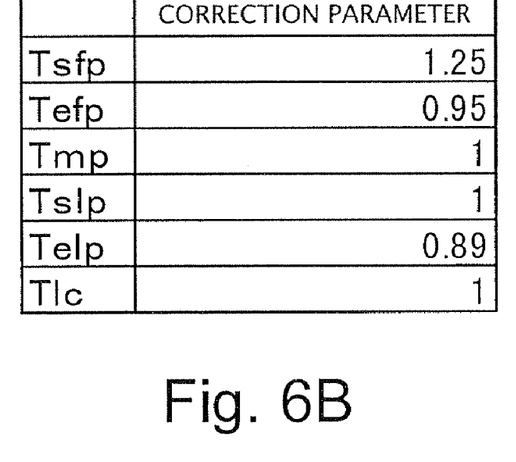
FIG. 6B is a view showing values of example correction parameters.

The correction parameters may be any values, so long as the values quantitatively determine a relationship between the optimum recording strategy and the recommended recording strategy. Therefore, a ratio of the optimum recording strategy to the recommended recording strategy rather than differences between the optimum recording strategy and the recommended recording strategy may also be determined by means of dividing values of respective parameters provided in the optimum recording strategy by values of respective parameters provided in a recommended recording strategy, to thus determine correction parameters. FIG. 6B is a view showing values of example correction parameters acquired when the ratio of the optimum recording strategy to the recommended recording strategy—which has been determined by dividing the values of the respective parameters provided in the optimum recording strategy by values of the respective parameters provided in the recommended recording strategy—is taken as a correction parameter.

Subsequently, procedures of pre-processing performed, when an optical disk is loaded, before the control section 20 actually records data will be described by reference to a flowchart shown in FIG. 7.

Figure 7:
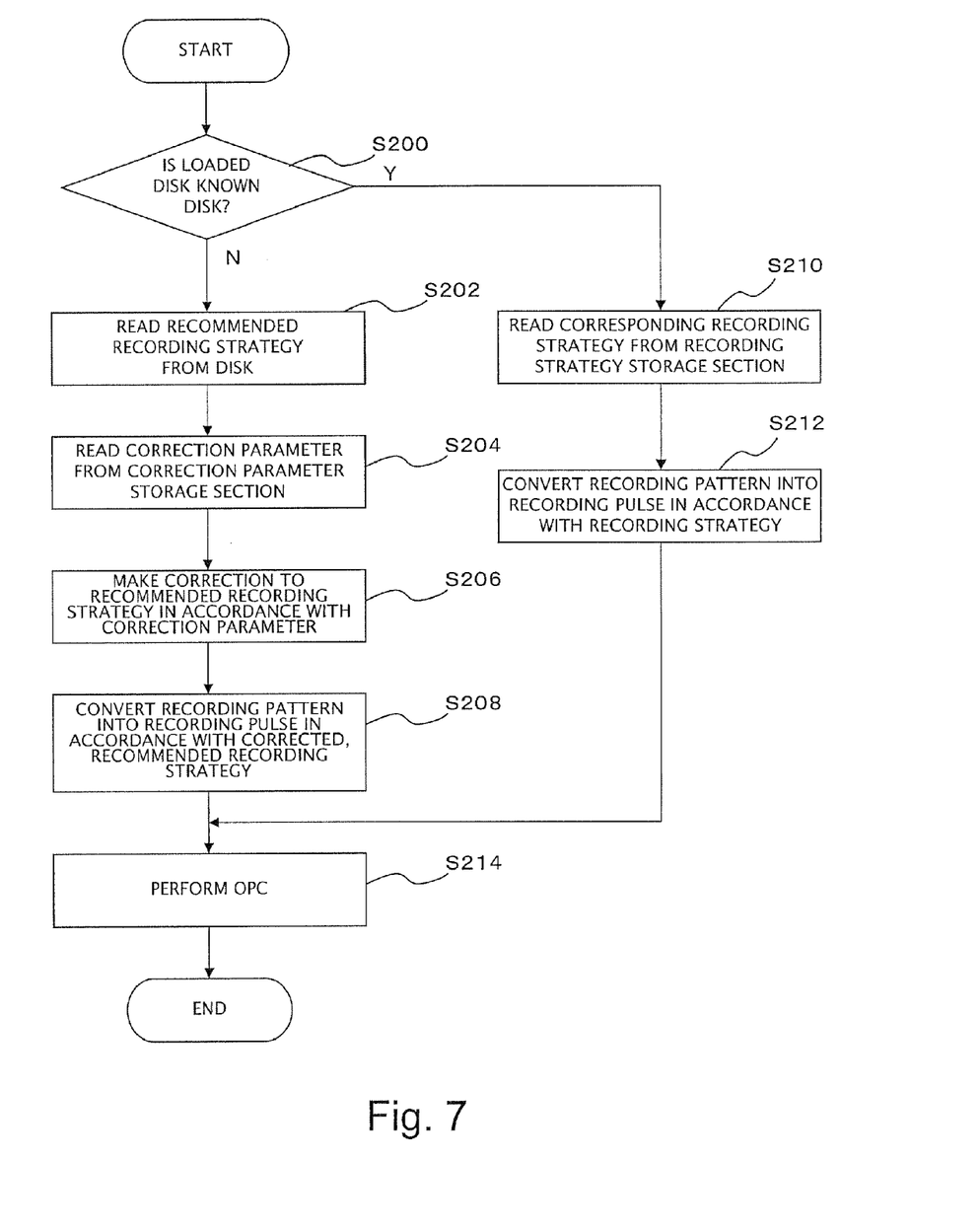
FIG. 7 is a flowchart showing procedures of pre-processing performed before a control section actually records data.

In FIG. 7, when an optical disk is loaded, the control section 20 determines whether the loaded optical disk is a known disk or an unknown disk (S200). Specifically, in accordance with the disk identification information provided in the predetermined area on the optical disk, the control section 20 determines whether or not the recording strategy corresponding to the loaded optical disk is registered in the recording strategy storage section 20c. When the recording strategy is registered, the loaded optical disk is determined to be a known optical disk.

When a result of determination shows that the loaded optical disk is an unknown disk (when a result of determination rendered in step S200 is negative "N"), the control section 20 reads a recommended recording strategy from the predetermined area on the loaded optical disk (S202). The type of the disk is determined in accordance with the disk identification information, and correction parameters corresponding to the thus-specified type of the disk are read from the correction parameter storage section 20f (S204). When different correction parameters are registered in the correction parameter storage section 20f for each recording speed, correction parameters corresponding to the loaded optical disk are read from the correction parameter storage section 20f in accordance with the type of a disk and a recording speed of the same.

Next, the control section 20 makes a correction to the thus-read recommended recording strategy on the basis of the correction parameters, and determines a corrected, recommended recording strategy as a recording strategy of the loaded optical disk (S206).

Figure 8A:
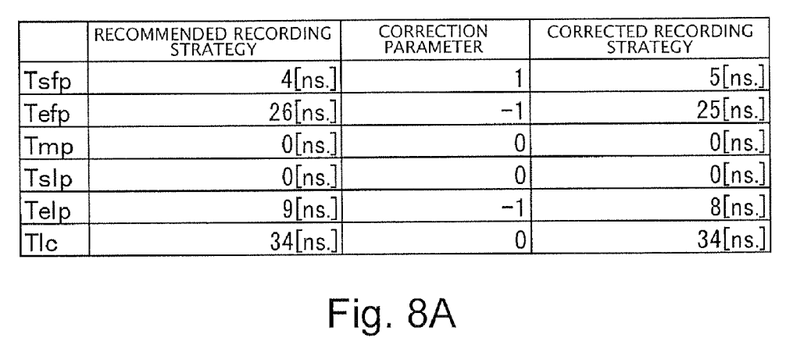
FIG. 8A shows example parameters acquired when a recommended recording strategy is corrected by means of adding parameters of a recommended recording strategy to respective correction parameters.

As shown in; for instance, FIG. 6A, when the correction parameters are determined by subtracting values of respective parameters provided in the recommended recording strategy from values of the respective parameters provided in the optimum recording strategy, the parameters of the recommended recording strategy are added to the respective correction parameters, thereby making a correction to the recommended recording strategy in accordance with the correction parameters. FIG. 8A shows example parameters acquired when a correction has been made to the recommended recording strategy by addition of the respective parameters of the recommended recording strategy to the correction parameters.

Figure 8B:
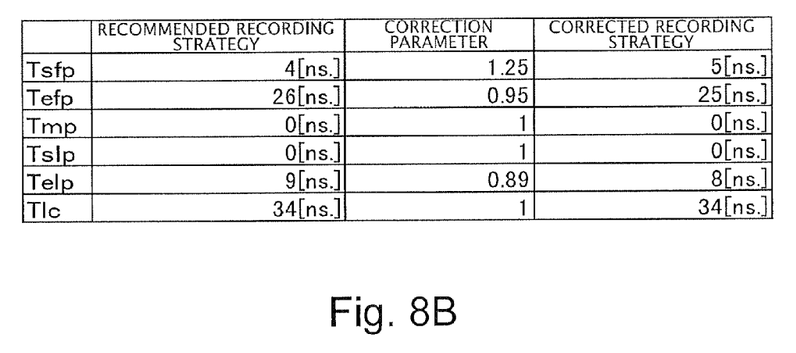
FIG. 8B shows example parameters acquired when a recommended recording strategy is corrected by means of multiplying parameters of a recommended recording strategy by respective correction parameters.

Moreover, as shown in FIG. 6B, when the correction parameters are determined by subtracting the values of the respective parameters provided in the optimum recording strategy from values of the respective parameters provided in the recommended recording strategy, the parameters of the recommended recording strategy are multiplied by the correction parameters, thereby making a correction to the recommended recording strategy in accordance with the correction parameters. FIG. 8B shows example parameters acquired when a correction is made to the recommended recording strategy by multiplying parameters of the recommended recording strategy by correction parameters.

After the recommended recording strategy has been corrected in step S206, the control section 20 converts the recording pattern into a recording pulse in accordance with the corrected, recommended recording strategy (S208).

Meanwhile, when a result of determination shows that the loaded optical disk is a known disk (the result of determination rendered in step S200 is affirmative "Y"), the control section 20 reads a recording strategy corresponding to the loaded optical disk from the recording strategy storage section 20c (S210). In accordance with the thus-read recording strategy, the recording pattern is converted into the recording pulse (S212).

After conversion of the recording pattern into the recording pulse, the control section 20 performs OPC (S214) and subsequently commences recording actual data.

As above, in the present embodiment, in the case of an unknown optical disk, the recommended recording strategy previously recorded in the loaded optical disk is not used in unmodified form. A recording pattern is converted into a recording pulse by use of the recommended recording strategy corrected in accordance with correction parameters. In general, each of disk drives has an individual difference in terms of the wavelength of a laser diode of an optical pickup (OPU), an angle of inclination of the optical axis with respect to a disk plane, and the like. Therefore, when recording is performed by using, in unmodified form, the recommended recording strategy previously recorded in an unknown disk, there may arise a case where sufficient recording quality is not acquired. However, according to the present embodiment, the recommended recording strategy previously recorded in an unknown optical disk is not used in unmodified form, and there is employed a recommended recording strategy corrected by use of correction parameters determined for each optical disk drive. Therefore, when compared with the case where the recommended recording strategy is used in unmodified form, a decrease in recording quality can be prevented.

In the case of an optical disk drive capable of setting a plurality of recording speeds, there is a case where data have hitherto been recorded on an unknown optical disk by limiting a recording speed to a low speed, thereby preventing occurrence of a decrease in recording quality. However, according to the present embodiment, when compared with the case where the recommended recording strategy is used in unmodified form, a decrease in recording quality can be prevented. Therefore, a recording speed which is faster than that achieved in the related art can be set in relation to an unknown optical disk.

Moreover, even when an optical disk drive determines a recording strategy optimum for an individual optical disk while taking a recommended recording strategy previously recorded in an optical disk as a reference recording strategy and while switching a recording strategy stepwise with reference to the reference recording strategy, as required, a correction is made to the reference recording strategy in accordance with correction parameters unique to the optical disk drive. As a result, when compared with the case where the optimum recording strategy is determined from an uncorrected reference recording strategy, a processing time consumed before determination of an optimum recording strategy can be shortened.

Moreover, even in the case of an optical disk drive which does not previously record optimum recording strategies in memory and records data, as required, in accordance with a recommended recording strategy previously recorded in an optical disk, the data are recorded in accordance with the recommended recording strategy corrected according to the correction parameters unique to the optical disk drive, thereby preventing a decrease in recording quality.

In addition, even when sufficient recording quality is not acquired for reasons of changes in specifications of a known disk, variations in manufacture, or the like, in spite of data being recorded by use of an optimum recording strategy previously held in the optical disk drive, the data are recorded in accordance with the recommended recording strategy of a known optical disk corrected according to correction parameters unique to the optical disk drive, thereby preventing occurrence of a decrease in recording quality.

The above descriptions have mentioned an example where all of the determined correction parameters are registered in the correction parameter storage section 20f. However, depending on an optical disk drive, small differences exist between a recommended recording strategy and an optimum recording strategy, and there may be a case where sufficient recording quality can be acquired even when the recommended recording strategy is used directly for an unknown recording strategy. In such a case, the recommended recording strategy does not always need to be corrected by means of correction parameters. Accordingly, when the determined correction parameters fall within a predetermined allowable range; for example when values of correction parameters are equal to or smaller than predetermined threshold values, the control section 20 determines differences between the recommended recording strategy and the optimum recording strategy to be small, and the determined correction parameters may also be registered in the correction parameter storage section 20f. In this case, when a loaded optical disk is an unknown optical disk, the control section 20 determines whether or not correction parameters corresponding to the optical disk are registered in the correction parameter storage section 20f. When the parameters have not been registered, a recommended recording strategy previously recorded in an unknown optical disk is used.

Moreover, in consideration of a case where the pulse width of a recording pulse generated from the recommended recording strategy corrected in accordance with the correction parameters is too short and where the LD drive signal generation section 20e cannot generate an LD drive signal in accordance with the recording pulse, allowable ranges are previously set for respective parameters of the corrected, recommended recording strategy. When parameters of the corrected, recommended recording strategy fall outside the allowable ranges, corrections to the respective parameters of the recommended recording strategy may be limited within the allowable ranges.

What is claimed is:

1. An optical disk drive for recording data on a loaded optical disk in accordance with a recording strategy corresponding to the loaded optical disk, the drive comprising:

a recording strategy determination section for determining a recording strategy of the loaded optical disk based on all three of: (i) an optimum recording strategy of a specific optical disk previously and empirically set for the optical disk drive, (ii) a recommended recording strategy previously recorded in a predetermined area on the specific optical disk that is compared with the optimum recording strategy of the specific optical disk to determine a correction parameter, and (iii) a recommended recording strategy previously recorded in a predetermined area on the loaded optical disk that is corrected based on the correction parameter, wherein the specific optical disk is one whose stable recording quality has been previously guaranteed in connection with a plurality of models of optical disk drives; and a recording section for recording data on the loaded optical disk in accordance with the determined recording strategy.

2. The optical disk drive according to claim 1, further comprising:
   a recording strategy storage section for storing recording strategies previously determined in accordance with attributes of optical disks, wherein
   the recording strategy determination section, when a recording strategy corresponding to the loaded optical disk is not stored in the recoding strategy storage section, determines the recording strategy of the loaded optical disk from the optimum recording strategy of the specific optical disk, the recommended recording strategy of the specific optical disk, and the recommended recording strategy of the loaded optical disk.

3. The optical disk drive according to claim 1, wherein the recording strategy determination section makes a correction to the recommended recording strategy of the loaded optical disk in accordance with the correction parameter determined from a relationship between the optimum recording strategy of the specific optical disk and the recommended recording strategy of the specific optical disk, thereby determining the corrected, recommended recording strategy of the loaded optical disk as a recording strategy of the loaded optical disk.

4. The optical disk drive according to claim 3, further comprising a correction parameter storage section for recording the correction parameter.

5. The optical disk drive according to claim 4, wherein the correction parameter storage section stores respective correction parameters previously determined in correspondence to respective recording speeds; and
   the recording strategy determination section determines correction parameters corresponding to a recording speed employed at the time of recording of data in accordance with correction parameters stored in the correction parameter storage section and makes a correction to the recommended recording strategy of the loaded optical disk in accordance with the determined correction parameters.

6. The optical disk drive according to claim 1, further comprising:
   a recording strategy optimization section for causing the recording section to perform test recording while changing a recording strategy with reference to the recording strategy determined before recording actual data on the loaded optical disk and making a correction to the determined recording strategy in accordance with a result of test recording, wherein
   the recording strategy determination section records data on the loaded optical disk in accordance with the corrected recording strategy.

7. A recording strategy determination method for determining a recording strategy when an optical disk drive records data on a loaded optical disk, the method comprising:
   determining a recording strategy for the loaded optical disk based on all three of: (i) an optimum recording strategy on a specific optical disk previously and empirically set for the optical disk drive which records data on a loaded optical disk, (ii) a recommended recording strategy previously recorded in a predetermined area on the specific optical disk that is compared with the optimum recording strategy of the specific optical disk to determine a correction parameter, and (iii) a recommended recording strategy previously recorded in a predetermined area on the loaded optical disk that is corrected based on the correction parameter, wherein the specific optical disk is one whose stable recording quality has been previously guaranteed in connection with a plurality of models of optical disk drives.

8. The recording strategy determination method according to claim 7, further comprising:
   determining the correction parameter from a difference between the optimum recording strategy of the specific optical disk and the recommended recording strategy of the specific optical disk; and
   making a correction to the recommended recording strategy of the loaded optical disk in accordance with the correction parameter and determining the corrected, recommended recording strategy of the loaded optical disk as a recording strategy for the loaded optical disk.

* * * * *